US010798210B2

(12) United States Patent
Matus et al.

(10) Patent No.: US 10,798,210 B2
(45) Date of Patent: *Oct. 6, 2020

(54) HANDLING NOTIFICATIONS

(71) Applicant: Facebook, Inc., Menlo Park, CA (US)

(72) Inventors: Jonathan Arie Matus, San Francisco, CA (US); Neel Ishwar Murarka, Portola Valley, CA (US); Philip Fung, San Francisco, CA (US); Joy-Vincent Niemantsverdriet, San Francisco, CA (US); Niv Seker, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,927

(22) Filed: Aug. 14, 2017

(65) Prior Publication Data

US 2018/0013855 A1 Jan. 11, 2018

Related U.S. Application Data

(63) Continuation of application No. 13/571,160, filed on Aug. 9, 2012, now Pat. No. 9,736,265.

(51) Int. Cl.
| | |
|---|---|
| *H04L 29/08* | (2006.01) |
| *H04M 1/67* | (2006.01) |
| *H04M 1/02* | (2006.01) |
| *H04M 1/725* | (2006.01) |

(52) U.S. Cl.
CPC ............ *H04L 67/306* (2013.01); *H04M 1/67* (2013.01); *H04M 1/0202* (2013.01); *H04M 1/72561* (2013.01); *H04M 2250/22* (2013.01)

(58) Field of Classification Search
CPC .... H04N 1/00458; G06F 3/0485; G06F 3/048
USPC ........................................................ 709/204
See application file for complete search history.

(56) References Cited

U.S. PATENT DOCUMENTS

| | | | |
|---|---|---|---|
| 9,292,310 B2* | 3/2016 | Chaudhri | ................ H04L 51/24 |
| 2006/0288234 A1* | 12/2006 | Azar | ....................... G06F 21/32 |
| | | | 713/186 |
| 2008/0120716 A1* | 5/2008 | Hall | ....................... G06F 21/554 |
| | | | 726/16 |
| 2008/0259094 A1* | 10/2008 | Kim | ....................... G06F 1/1626 |
| | | | 345/651 |
| 2009/0249247 A1* | 10/2009 | Tseng | ................ H04M 1/72552 |
| | | | 715/808 |
| 2010/0015976 A1* | 1/2010 | Issa | ..................... G06F 21/6263 |
| | | | 455/435.1 |
| 2010/0058231 A1* | 3/2010 | Duarte | .................. G06F 3/0481 |
| | | | 715/800 |

(Continued)

*Primary Examiner* — Mahran Y Abu Roumi
(74) *Attorney, Agent, or Firm* — Jordan IP Law, LLC (57) ABSTRACT

In particular embodiments, one or more notifications are presented on a screen of a personal computing device while the personal computing device is in a locked state. Entry of one or more user responses may be detected on the personal computing device while still in the locked state. Each user response may be associated with at least one notification. An authorization event associated with the personal computing device may be detected, thereby unlocking the personal computing device. The one or more user responses on the personal computing device may then be presented to the user for confirmation. Once user confirmation is received, confirmed user responses may then be published.

26 Claims, 6 Drawing Sheets

(56) References Cited

U.S. PATENT DOCUMENTS

| | | | |
|---|---|---|---|
| 2010/0146235 A1* | 6/2010 | Weber | G06Q 30/06 711/165 |
| 2010/0146384 A1* | 6/2010 | Peev | H04M 1/673 715/255 |
| 2010/0146437 A1* | 6/2010 | Woodcock | G06Q 30/06 715/806 |
| 2010/0248689 A1* | 9/2010 | Teng | H04M 1/67 455/411 |
| 2010/0269040 A1* | 10/2010 | Lee | G06F 3/04817 715/702 |
| 2010/0281409 A1* | 11/2010 | Rainisto | G06F 9/451 715/767 |
| 2011/0047368 A1* | 2/2011 | Sundaramurthy | G06F 3/0481 713/100 |
| 2011/0081889 A1* | 4/2011 | Gao | G06F 3/038 455/411 |
| 2011/0088086 A1* | 4/2011 | Swink | G06F 3/04883 726/7 |
| 2011/0252430 A1* | 10/2011 | Chapman | G06F 9/485 718/107 |
| 2012/0148037 A1* | 6/2012 | Brunson | H04M 3/2281 379/93.02 |
| 2012/0246739 A1* | 9/2012 | Mebed | G06F 21/00 726/28 |
| 2013/0007665 A1* | 1/2013 | Chaudhri | H04L 51/24 715/830 |
| 2013/0027429 A1* | 1/2013 | Hogg | H04W 4/12 345/633 |
| 2013/0122866 A1* | 5/2013 | Huang | G06F 21/31 455/411 |
| 2013/0130659 A1* | 5/2013 | Sadhvani | H04W 4/20 455/414.1 |
| 2013/0205215 A1* | 8/2013 | Dunn | H04L 41/22 715/738 |

* cited by examiner

HANDLING NOTIFICATIONS

PRIORITY

This application is a continuation under 35 U.S.C. § 120 of U.S. patent application Ser. No. 13/571,160, filed 9 Aug. 2012.

TECHNICAL FIELD

This disclosure generally relates to personal computing devices and more specifically relates to handling notifications.

BACKGROUND

Personal computing devices, such as mobile telephones (e.g., feature phones and smart phones), personal digital assistants (PDA), and mobile computers (e.g., tablet, netbook, and notebook computers), have become prevalent in people's daily lives. Many such devices are capable of supporting a variety of functionalities. Often, people carry relatively small and yet highly versatile mobile devices with them as they go through their daily lives (e.g., visit different places, participate in different events, perform different activities, etc.), and these mobile devices become extremely useful tools that bring convenience and flexibility to people's lives.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Present-day mobile devices may be of different types, such as feature or smart phones, personal digital assistants (PDAs), and mobile computers (e.g., tablets, netbooks, notebooks, laptops), and as a result, have a variety of different features that may perform a variety of different functions. For example, some mobile devices may have small, black-and-white screens, and may only be capable of sending and receiving cellular or voice data. Other basic-feature mobile devices may also be capable of sending and receiving text messages, thus exchanging data with another mobile device. More sophisticated mobile devices may have larger, color screens, capable of displaying and running multimedia data, such as text messages, images, audio files, videos, and the like. Such sophisticated mobile devices may be capable of sending and receiving both voice and binary data.

Nearly all mobile devices include memory (e.g., internal or add-on memory cards) that may be used to store information or data. A basic-feature mobile device has enough memory to store at least contact names and telephone numbers, whereas a more sophisticated mobile device has more memory for storing various types of information or data. In addition, nearly all mobile devices have security features, such as locked screens, that allow the user to prevent unauthorized access of the mobile device. In both the case of a basic-feature mobile device and a more sophisticated mobile device, a user may be required to interact with the mobile device to unlock it.

Particular embodiments augment functionality of the locked-screen state of a mobile device. In particular embodiments, before a user unlocks the screen, the user may handle or interact with the notifications or content immediately, such as submitting a "like" response or a "comment." Particular embodiments present one or more notifications on a personal computing device while the personal computing device is locked, receive one or more user responses on the personal computing device, and present the user with the one or more responses on the personal computing device for confirmation.

Figure 1:
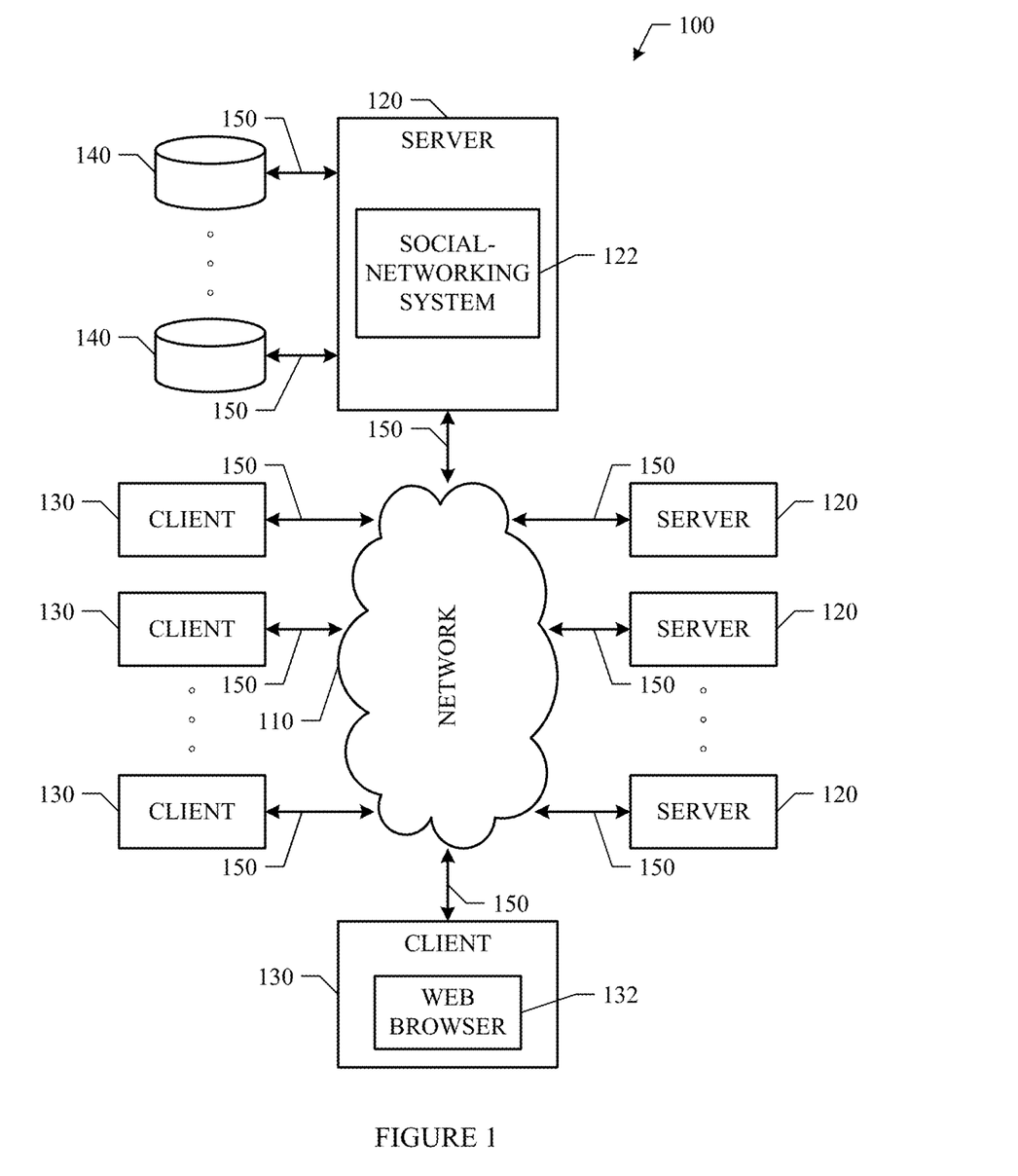
FIG. 1 illustrates an example system associated with a social network.

FIG. 1 illustrates an example system 100 associated with a social network. In the example of FIG. 1, system 100 includes a network 110 that couples one or more servers 120 to one or more personal computing devices 130 and one or more personal computing devices 130 to each other. In particular embodiments, network 110 is an intranet, an extranet, a virtual private network (VPN), a local area network (LAN), a wireless LAN (WLAN), a wide area network (WAN), a metropolitan area network (MAN), a portion of the Internet, a cellular technology-based network, a satellite communications technology-based network, or another network 110 or a combination of two or more such networks 110. This disclosure contemplates any suitable network 110.

One or more links 150 couple a server 120 or a personal computing device 130 to network 110. In particular embodiments, one or more links 150 each includes one or more wireline, wireless, or optical links 150. In particular embodiments, one or more links 150 each includes an intranet, an extranet, a VPN, a LAN, a WLAN, a WAN, a MAN, a portion of the Internet, a cellular technology-based network, a satellite communications technology-based network, or another link 150 or a combination of two or more such links 150. This disclosure contemplates any suitable links 150 coupling servers 120 and personal computing devices 130 to network 110.

In particular embodiments, each server 120 may be a unitary server or a distributed server spanning multiple computers or multiple datacenters. Servers 120 may be of various types, such as, for example and without limitation, web server, news server, mail server, message server, advertising server, file server, application server, exchange server, database server, proxy server, another server suitable for performing functions and processes described herein, or any combination thereof. In particular embodiments, each server 120 may include hardware, software, or embedded logic components or a combination of two or more such components for carrying out the appropriate functionalities implemented or supported by server 120. In particular embodiments, each server 120 may include may include hardware, software, or embedded logic components or a combination of two or more such components for carrying out data communications, which may be based on a protocol. For example, a web server is generally capable of hosting websites containing web pages or particular elements of web pages. More specifically, a web server may host HTML files or other file types, or may dynamically create or constitute files upon a request, and communicate them to personal computing devices 130 in response to HTTP or other requests from personal computing devices 130. A mail server is generally capable of providing electronic mail services to various personal computing devices 130. A database server is generally capable of providing an interface for managing data stored in one or more data stores. In particular embodiments, a social-networking system 122 may be hosted on a server 120. In particular embodiments, server 120 may transmit data using a protocol, e.g., HTTP, TCP, UDP, MQTT, WAP, ICMP, POP3, SMTP, FTP, IMAP, HOP, RMI, DCOM, DDE, SOAP, Mobile IP, XOT, IRC, SNMP, SOCKS, SHTTP, SMS, SMSTP, MMS, or any other conventional protocol, or any combination thereof.

In particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. In particular embodiments, each data storage 140 may be a relational database. Particular embodiments may provide interfaces that enable servers 120 or personal computing devices 130 to manage, e.g., retrieve, modify, add, or delete, the information stored in data storage 140.

In particular embodiments, each personal computing device 130 may be an electronic device including hardware, software, or embedded logic components or a combination of two or more such components and capable of carrying out the appropriate functionalities implemented or supported by personal computing device 130. For example and without limitation, a personal computing device 130 may comprise a computer system such as: a desktop computer, a notebook or laptop, a netbook, a tablet, an e-book reader, a GPS device, a camera, a personal digital assistant (PDA), a handheld electronic device, a mobile telephone, or another similar processor-based electronic device. This disclosure contemplates any suitable personal computing devices 130. A personal computing device 130 may enable a network user at personal computing device 130 to access network 130. A personal computing device 130 may enable its user to communicate with other users at other personal computing devices 130.

A personal computing device 130 may have a web browser, such as MICROSOFT® INTERNET EXPLORER®, GOOGLE CHROME™ or MOZILLA FIREFOX®, and may have one or more add-ons, plug-ins, or other extensions. Personal computing device 130 may render a web page based on the HTML files from server 120 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT®, JAVA®, MICROSOFT® SILVERLIGHT, combinations of markup language and scripts such as AJAX (Asynchronous JAVASCRIPT® and XML), and the like. Herein, reference to a web page encompasses one or more corresponding web page files (which a browser may use to render the web page) and vice versa, where appropriate.

Figure 2A:
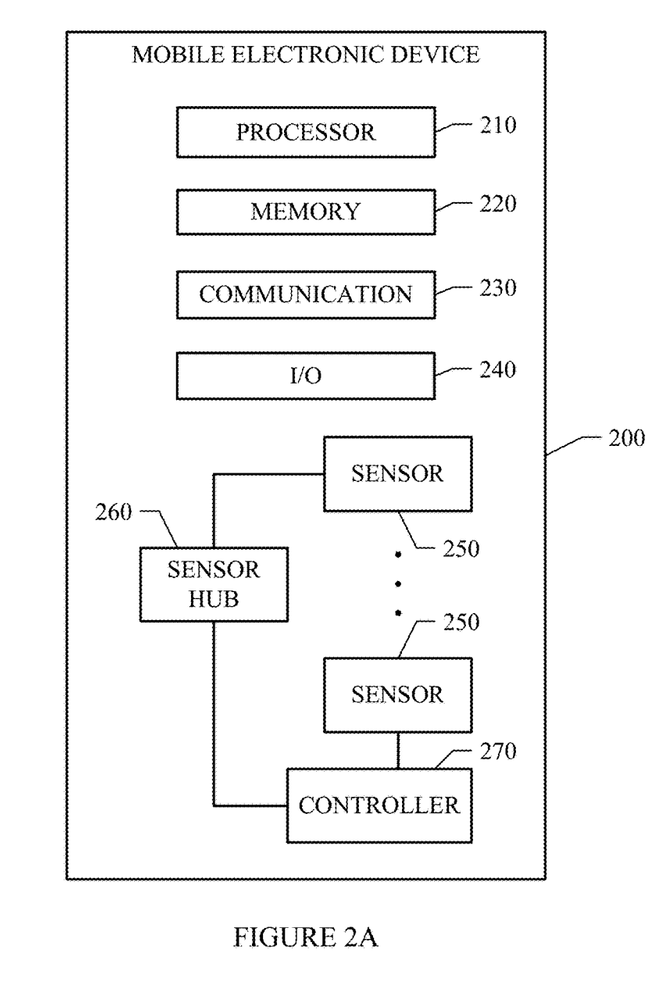
FIGS. 2A-B illustrate an example personal computing device.

FIG. 2A illustrates an example personal computing device 200. In particular embodiments, personal computing device 200 may comprise a processor 210, a memory 220, a communication component 230 (e.g., antenna and communication interface for wireless communications), one or more input and/or output (I/O) components and/or interfaces 240, and one or more sensors 250. In particular embodiments, one or more I/O components and/or interfaces 240 may incorporate one or more sensors 250. In particular embodiments, personal computing device 200 may comprise a computer system or and element thereof as described in FIG. 7 and associated description.

In particular embodiments, a personal computing device, such as a mobile device, may include various types of sensors 250, such as, for example and without limitation: touch sensors (disposed, for example, on a display of the device, the back of the device and/or one or more lateral edges of the device) for detecting a user touching the surface of the personal computing device (e.g., using one or more fingers); accelerometer for detecting whether the personal computing device 200 is moving and the speed of the movement; thermometer for measuring the temperature change near the personal computing device 200; proximity sensor for detecting the proximity of the personal computing device 200 to another object (e.g., a hand, desk, or other object); light sensor for measuring the ambient light around the personal computing device 200; imaging sensor (e.g., camera) for capturing digital still images and/or video of objects near the personal computing device 200 (e.g., scenes, people, bar codes, QR codes, etc.); location sensors (e.g., Global Positioning System (GPS)) for determining the location (e.g., in terms of latitude and longitude) of the personal computing device; sensors for detecting communication networks within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of personal computing device 200; etc. This disclosure contemplates that a personal computing device may include any applicable type of sensor. Sensors may provide various types of sensor data, which may be analyzed to determine the user's intention with respect to the personal computing device at a given time.

In particular embodiments, determining a location of the personal computing device is based on GPS information, triangulation information, proximity to one or more other designated safe devices, calendar information, or any combination thereof.

In particular embodiments, a sensors hub 260 may optionally be included in personal computing device 200. Sensors 250 may be connected to sensors hub 260, which may be a low power-consuming processor that controls sensors 250, manages power for sensors 250, processes sensor inputs, aggregates sensor data, and performs certain sensor functions. In addition, in particular embodiments, some types of sensors 250 may be connected to a controller 270. In this case, sensors hub 260 may be connected to controller 270, which in turn is connected to sensor 250. Alternatively, in particular embodiments, there may be a sensor monitor in place of sensors hub 260 for managing sensors 250.

In particular embodiments, in addition to the front side, personal computing device 200 may have one or more sensors for performing biometric identification. Such sensors may be positioned on any surface of personal computing device 200. In example embodiments, as the user's hand touches personal computing device 200 to grab hold of it, the touch sensors may capture the user's fingerprints or palm vein pattern. In example embodiments, while a user is viewing the screen of personal computing device 200, a camera may capture an image of the user's face to perform facial recognition. In example embodiments, while a user is viewing the screen of personal computing device 200, an infrared scanner may scan the user's iris and/or retina. In example embodiments, while a user is in contact or close proximity with personal computing device 200, chemical and/or olfactory sensors may capture relevant data about a user. In particular embodiments, upon detecting that there is a change in state with respect to the identity of the user utilizing personal computing device 200, either by itself or in combination with other types of sensor indications, personal computing device 200 may determine that it is being shared.

In particular embodiments, in addition to the front side, the personal computing device 200 may have touch sensors on the left and right sides. Optionally, the personal computing device 200 may also have touch sensors on the back, top, or bottom side. Thus, as the user's hand touches personal computing device 200 to grab hold of it, the touch sensors may detect the user's fingers or palm touching personal computing device 200. In particular embodiments, upon detecting that there is a change in state with respect to a user touching personal computing device 200, either by itself or in combination with other types of sensor indications, personal computing device 200 may determine that it is being shared.

In particular embodiments, personal computing device 200 may have an accelerometer in addition to or instead of the touch sensors on the left and right sides. Sensor data provided by the accelerometer may also be used to estimate whether a new user has picked up personal computing device 200 from a resting position, e.g., on a table or desk, display shelf, or from someone's hand or from within someone's bag. When the user picks up personal computing device 200 and brings it in front of the user's face, there may be a relatively sudden increase in the movement speed of personal computing device 200. This change in the device's movement speed may be detected based on the sensor data supplied by the accelerometer. In particular embodiments, upon detecting that there is a significant increase in the speed of the device's movement, either by itself or in combination with other types of sensor indications, personal computing device 200 may determine that it is being shared.

In particular embodiments, personal computing device 200 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of personal computing device 200. When personal computing device 200 is stored on a shelf or in the user's bag, it may stay mostly in one orientation. However, when the user grabs hold of personal computing device 200 and lifts it up and/or moves it closer to bring it in front of the user's face, there may be a relatively sudden change in the orientation of personal computing device 200. The orientation of personal computing device 200 may be detected and measured by the gyrometer. If the orientation of personal computing device 200 has changed significantly, In particular embodiments, upon detecting that there is a significant change in the orientation of personal computing device 200, either by itself or in combination with other types of sensor indications, personal computing device 200 may determine that it is being shared.

In particular embodiments, personal computing device 200 may have a light sensor. When personal computing device 200 is stored in a receptacle, e.g., the user's pocket or bag, or in a case or holster, it is relatively dark around personal computing device 200. On the other hand, when the user brings personal computing device 200 out of his pocket, it may be relatively bright around personal computing device 200, especially during day time or in well-lit areas. The sensor data supplied by the light sensor may be analyzed to detect when a significant change in the ambient light level around personal computing device 200 occurs. In particular embodiments, upon detecting that there is a significant increase in the ambient light level around personal computing device 200, either by itself or in combination with other types of sensor indications, personal computing device 200 may determine that it is being shared.

In particular embodiments, personal computing device 200 may have a proximity sensor. The sensor data supplied by the proximity sensor may be analyzed to detect when personal computing device 200 is in close proximity to a specific object, such as the user's hand. For example, personal computing device 200 may have an infrared LED (light-emitting diode) 290 (i.e., proximity sensor) placed on its back side. When the user holds such a personal computing device in his hand, the palm of the user's hand may cover infrared LED 290. As a result, infrared LED 290 may detect when the user's hand is in close proximity to personal computing device 200. In particular embodiments, upon detecting that personal computing device 200 is in close proximity to the user's hand, either by itself or in combination with other types of sensor indications, personal computing device 200 may determine that it is being shared.

A personal computing device 200 may have any number of sensors of various types, and these sensors may supply different types of sensor data. Different combinations of the individual types of sensor data may be used together to detect and estimate a user's current intention with respect to personal computing device 200 (e.g., whether the user really means to take personal computing device 200 out of his pocket and use it). Sometimes, using multiple types of sensor data in combination may yield a more accurate, and thus better, estimation of the user's intention with respect to personal computing device 200 at a given time than only using a single type of sensor data. Nevertheless, it is possible to estimate the user's intention using a single type of sensor data (e.g., touch-sensor data).

Figure 2B:
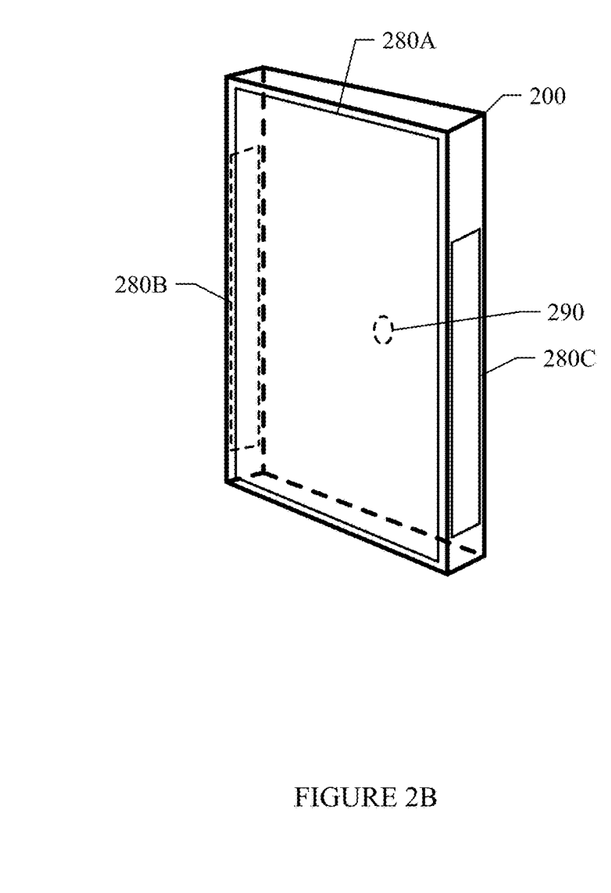

FIG. 2B illustrates the exterior of an example personal computing device 200. Touch sensors may be placed anywhere on any surface of personal computing device 200. For example, in FIG. 2, a touchscreen incorporating touch sensors 280A is placed on the front of personal computing device 200. The touchscreen may function as an input/output (I/O) component for personal computing device 200. In addition, touch sensors 280B and 280C are placed on the left and right sides of personal computing device 200, respectively. Touch sensors 280B and 280C may detect a user's hand touching the sides of personal computing device 200. In particular embodiments, touch sensors 280A, 280B, 280C may be implemented using resistive, capacitive, and/or inductive touch sensors. The electrodes of the touch sensors 280A, 280B, 280C may be arranged on a thin solid piece of material or a thin wire mesh. In the case of capacitive touch sensors, there may be two types of electrodes: transmitting and receiving. These electrodes may be connected to a controller (e.g., controller 270 illustrated in FIG. 2), which may be a microchip designed to drive the transmitting electrodes with electrical pulses and measure the changes in capacitance from the receiving electrodes caused by a user's touches in order to detect the locations of the user touches.

In particular embodiments, personal computing device 200 may have a proximity sensor 290 (e.g., an infrared LED) placed on its back side. Proximity sensor 290 may be able to supply sensor data for determining its proximity, and thus the proximity of personal computing device 200, to another object.

Figure 3:
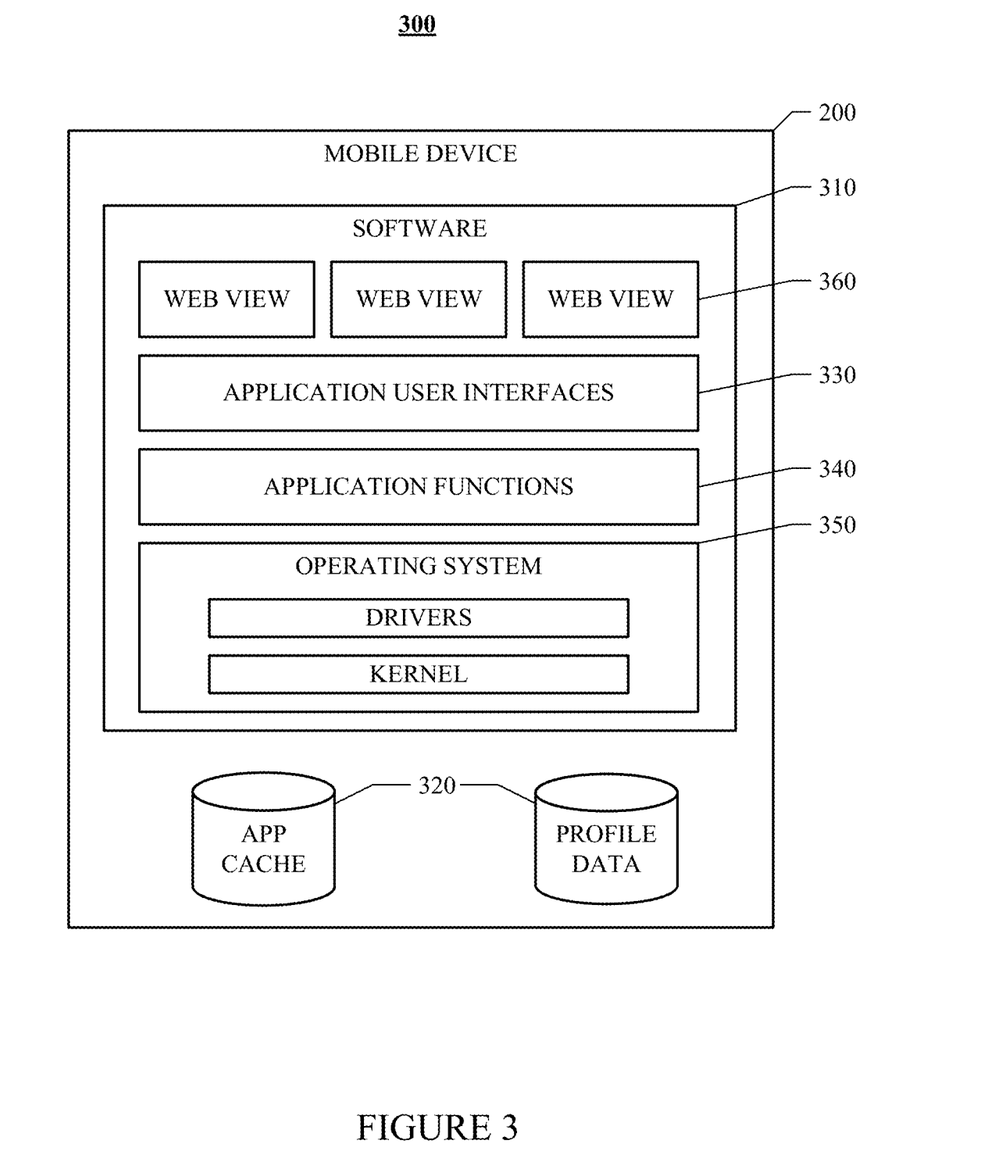
FIG. 3 illustrates an example software architecture for information and application on a mobile device.

FIG. 3 illustrates an example software architecture 300 for information and applications on a personal computing device 200. In particular embodiments, software architecture 300 may comprise software 310 and data store(s) 320. In particular embodiments, personal information may be stored in an application data cache 320 and/or a profile data store 320 and/or another data store 320. In particular embodiments, one or more software applications may be executed on personal computing device 200. In particular embodiments, they may be web-based applications hosted on servers. For example, a web-based application may be associated with a URI (Uniform Resource Identifier) or URL (Uniform Resource Locator). From personal computing device 200, a user may access the web-based application through its associated URI or URL (e.g., by using a web browser). Alternatively, in other embodiments, they may be native applications installed and residing on personal computing device 200. Thus, software 310 may also include any number of application user interfaces 330 and application functions 340. For example, one application (e.g., Google Maps®) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using personal computing device 200; a fifth application may allow the device user to receive and initiate VoIP and/or cellular network calls, and so on. Each application has one or more specific functionalities, and the software (e.g., one or more software modules) implementing these functionalities may be included in application functions 340. Each application may also have a user interface that enables the device user to interact with the application, and the software implementing the application user interface may be included in application user interfaces 330. In particular embodiments, the functionalities of an application may be implemented using JavaScript®, Java®, C, or other suitable programming languages. In particular embodiments, the user interface of an application may be implemented using HyperText Markup Language (HTML), JavaScript®, Java®, or other suitable programming languages.

In particular embodiments, the user interface of an application may include any number of screens or displays. In particular embodiments, each screen or display of the user interface may be implemented as a web page. Thus, the device user may interact with the application through a series of screens or displays (i.e., a series of web pages). In particular embodiments, operating system 350 is Google's Android™ mobile technology platform. With Android®, there is a Java® package called "android.webkit", which provides various tools for browsing the web. Among the "android.webkit" package, there is a Java class called "android.webkit.WebView", which implements a View for displaying web pages. This class uses the WebKit rendering engine to display web pages and includes methods to navigate forward and backward through a history, zoom in, zoom out, perform text searches, and so on. In particular embodiments, an application user interface 330 may utilize Android's WebView application programming interface (API) to display each web page of the user interface in a View implemented by the "android.webkit.WebView" class. Thus, in particular embodiments, software 310 may include any number of web views 360, each for displaying one or more web pages that implement the user interface of an application.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, a web view 360 or application user interfaces 330. Each input event may be forwarded to application functions 340, or application functions 340 may listen for input events thus generated. When application functions 340 receive an input event, the appropriate software module in application functions 340 may be invoked to process the event. In addition, specific functionalities provided by operating system 350 and/or hardware (e.g., as described in FIGS. 1 and 2A-B) may also be invoked. For example, if the event is generated as a result of the user pushing a button to take a photo with personal computing device 200, a corresponding image processing module may be invoked to convert the raw image data into an image file (e.g., JPG or GIF) and store the image file in the storage 320 of personal computing device 200. As anther example, if the event is generated as a result of the user selecting an icon to compose an instant message, the corresponding short message service (SMS) module may be invoked to enable the user to compose and send the message.

In particular embodiments, when an output of the application is ready to be presented to the user, an event (e.g., an output event) may be generated by, for example, a software module in application functions 340 or operating system 350. Each output event may be forwarded to application user interfaces 330, or application user interfaces 330 may listen for output events thus generated. When application user interfaces 330 receive an output event, it may construct a web view 360 to display a web page representing or containing the output. For example, in response to the user selecting an icon to compose an instant message, an output may be constructed that includes a text field that allows the user to input the message. This output may be presented to the user as a web page and displayed to the user in a web view 360 so that the user may type into the text field the message to be sent.

The user interface of an application may be implemented using a suitable programming language (e.g., HTML, JavaScript®, or Java®). More specifically, in particular embodiments, each web page that implements a screen or display of the user interface may be implemented using a suitable programming language. In particular embodiments, when a web view 360 is constructed to display a web page (e.g., by application user interfaces 330 in response to an output event), the code implementing the web page is loaded into web view 360.

Figure 4:
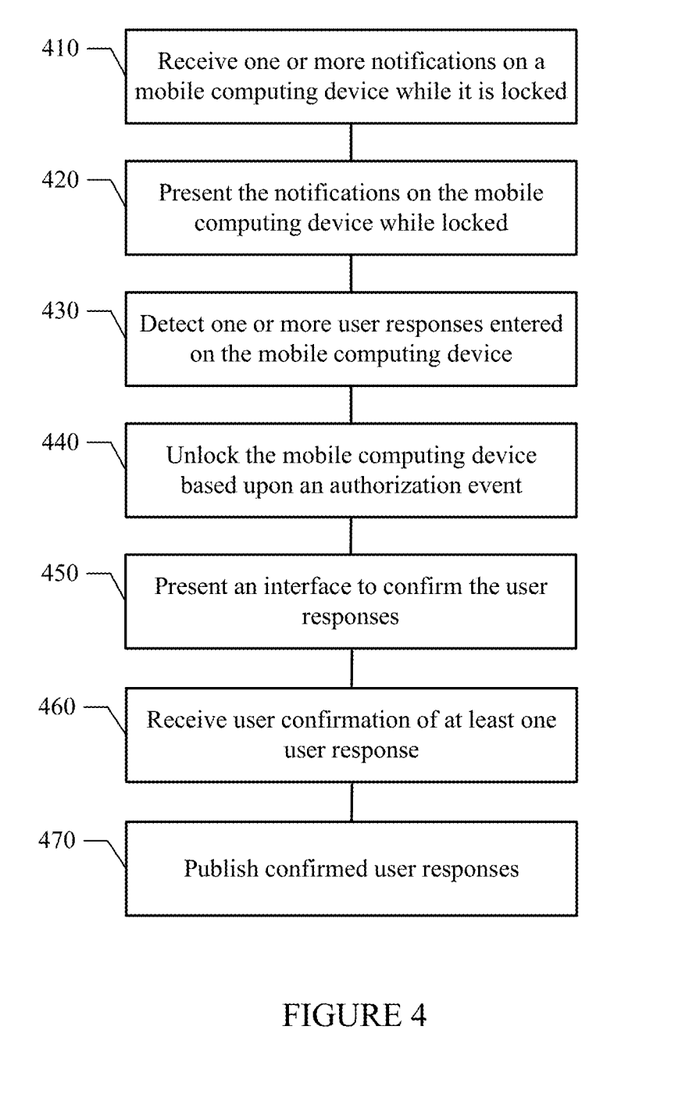
FIG. 4 illustrates an example method for performing particular embodiments.

FIG. 4 illustrates an example method for interacting with locked-screen notifications. The method may start at step 410, where one or more notifications may be received on a personal computing device while the personal computing device is in a locked state. Notifications may be received by the personal computing device when the device is locked or unlocked.

At step 420, one or more notifications may be presented on the personal computing device while the personal computing device is in a locked state. In particular embodiments, presenting notifications comprises one or more of displaying the notification on a screen of the personal computing device, playing a sound representing the notification using an audio output of the personal computing device, illuminating the screen or another visual indicator on the personal computing device, causing the personal computing device to provide haptic output representing the notification, or any combination thereof.

At step 430, the personal computing device may detect one or more user responses to the one or more notifications. A user may perform one or more explicit actions that are received as user responses on the personal computing device while the personal computing device remains locked. In particular embodiments, each of the user responses are associated with at least one of the one or more notifications. A user response may comprise a comment, a like indication, a dislike indication, a delete action, a hide action, a categorization action, a moderation action, a rating, a flag, a characterization, or any combination thereof. In particular embodiments, a single user response may be associated with more than one notification, e.g., performing a swipe gesture to hide multiple notifications at once.

At step 440, the personal computing device may detect an authorization event and release itself from the locked state. In particular embodiments, an authorization event comprises an affirmative user action, the user action comprising entry of a valid password either through interaction with a keyboard or touch screen or interaction with a voice sensor, a swipe gesture, a button click, activation of a touch sensor of the personal computing device, activation of a gyroscope of the personal computing device, activation of an accelerometer of the personal computing device, or any combination thereof.

In particular embodiments, the authorization event may comprise passive detection of a change in state of the personal computing device, such as determining a location of the personal computing device, detecting that the screen of the personal computing device is hidden, detecting that headphones are connected to the personal computing device, detecting that the personal computing device is being held by its owner, detecting that the personal computing device is connected for recharging, detecting that the personal computing device is located within a receptacle, detecting that the personal computing device is connection to a designated communications network, or any combination thereof.

In particular embodiments, functionality of the personal computing device may be fully unlocked upon detection of an affirmative authorization event or a passive authorization event. In particular embodiments, functionality of the personal computing device may only be partially unlocked upon detection of a passive authorization event.

At step 450, any user responses that were entered while the personal computing device was in a locked state may be presented on the personal computing device for confirmation. In particular embodiments, the user may select particular responses to confirm; in particular embodiments, the user may be able to select all responses for confirmation at once. Selection of particular responses may be accomplished using any conventional method, e.g., clicking checkboxes, buttons, or links, making a swipe gesture, saying a voice command, etc.

At step 460, confirmation of one or more user responses may be received. In particular embodiments, there are publishing rules associated with user actions taken while the personal computing device is locked. For example, there may be one or more social and privacy rules associated with publishing user actions on notifications received while the personal computing device is locked. In particular embodiments, security or privacy rules may be disabled, thus requiring no user confirmation of responses. In particular embodiments, such disabling of rules may be configured for all types of notifications, or for only certain types of notifications. In particular embodiments, confirmation occurs when the user selects all actions for publication. In particular embodiments, a cancellation button appears next to a confirmation button for each user response to be confirmed.

At step 470, any confirmed user responses may be published. In particular embodiments, publication may comprise displaying the confirmed user responses on associated web pages or RSS feeds, providing notifications to other users of the confirmed responses, or any other conventional manner of publication. In particular embodiments, publication may comprise updating one or more databases with information associated with the user responses, or transmitting information associated with the user responses to third-party servers.

In particular embodiments, the user or an administrator may be able to configure settings or preferences associated with the user's profile or associated with the device to enable or disable the ability to interact with notifications while the personal computing device is in a locked state.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5A:
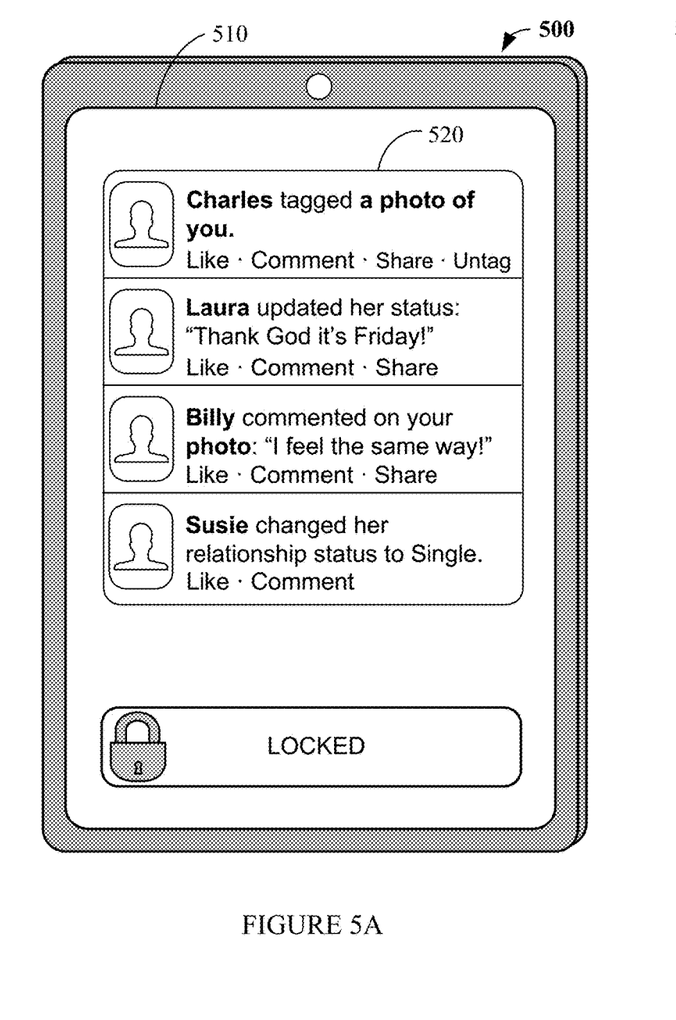
FIGS. 5A-B illustrate example user interfaces for handling notifications.

FIG. 5A illustrates an example personal computing device 500 with a screen 510. Screen 510 displays one or more notifications 520 received by personal computing device 500. In particular embodiments, notifications may have been received at a user's personal computing device from the user's friends, such as Charles, Laura, Billy, and Susie, while the user's personal computing device was locked. For example, a first notification comprises a notification from Charles that he added seven photos of you 20 minutes ago, a second notification comprises a notification from Laura that she liked your photo 5 minutes ago, a third notification comprises Billy commenting on your photo three minutes ago, and a fourth notification comprises a notification from Susie that she liked Billy's comment. In addition to the example illustrated in FIG. 5A, an example presentation may comprise playing a sound using an audio output of the personal computing device that represents the one or more notifications, illuminating the screen or another visual indicator on the personal computing device, or causing the computing device to provide haptic output that represents the notification.

In particular embodiments, the user respond to a notification by interacting with one or more sensors, as described above, that are located in various locations on or inside personal computing device 500 that can sense an affirmative or passive user action. For example a user may interact with screen 510, that may be a touch screen, by executing a unique gesture with respect to screen 510. In particular embodiments, a user may interact with a keyboard that is physically present on the personal computing device or graphically represented on screen 510 to initiate a user response. In particular embodiments, a user may interact with personal computing device by reciting a voice command or phrase in conjunction with voice identification, or by grasping the personal computing device in such a way that personal computing device receives the response, such as through the sensors located around the personal computing device in FIG. 2B.

Figure 5B:
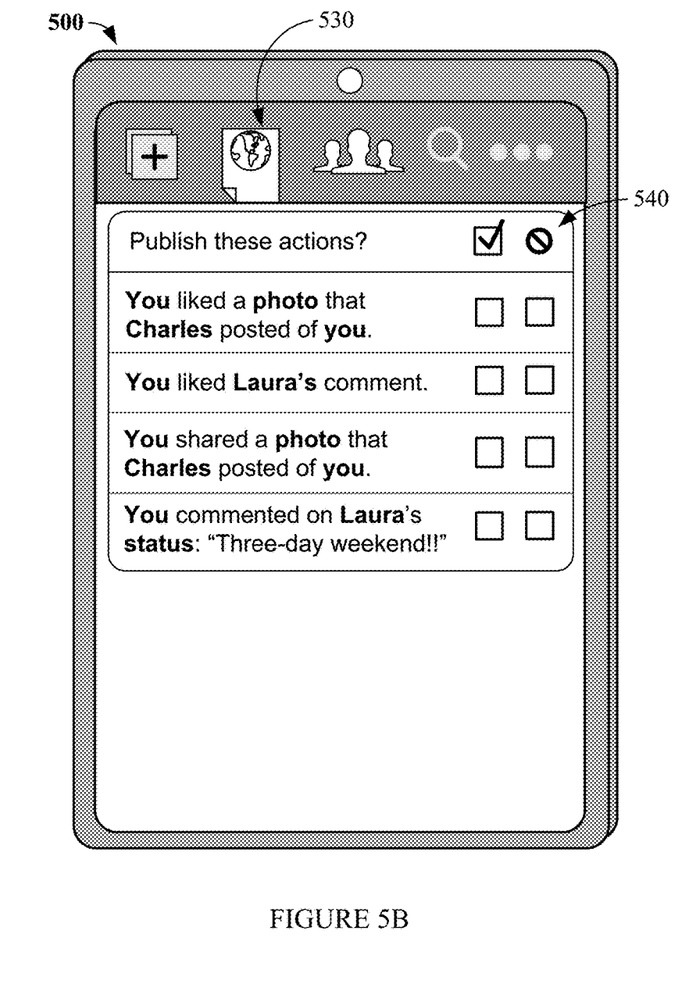

FIG. 5B illustrates an example user interface that appears on the personal computing device once the personal computing device is unlocked. The user may select one or more responses for publication, thus confirming the responses that were entered while the device was in a locked state. Once the personal computing device is unlocked, a confirmation icon and/or window 530 appears on personal computing device 500. The user interface presents all of the user responses that were received while the personal computing device 500 was locked. The user is prompted to confirm, and thereby publish the responses. In the example embodiment shown in FIG. 5B, by checking each respective box 540, the user can select which responses to publish (or choose to publish all responses at once). In particular embodiments, the user can choose to cancel a particular response entered while the personal computing device was in the locked state.

Figure 6:
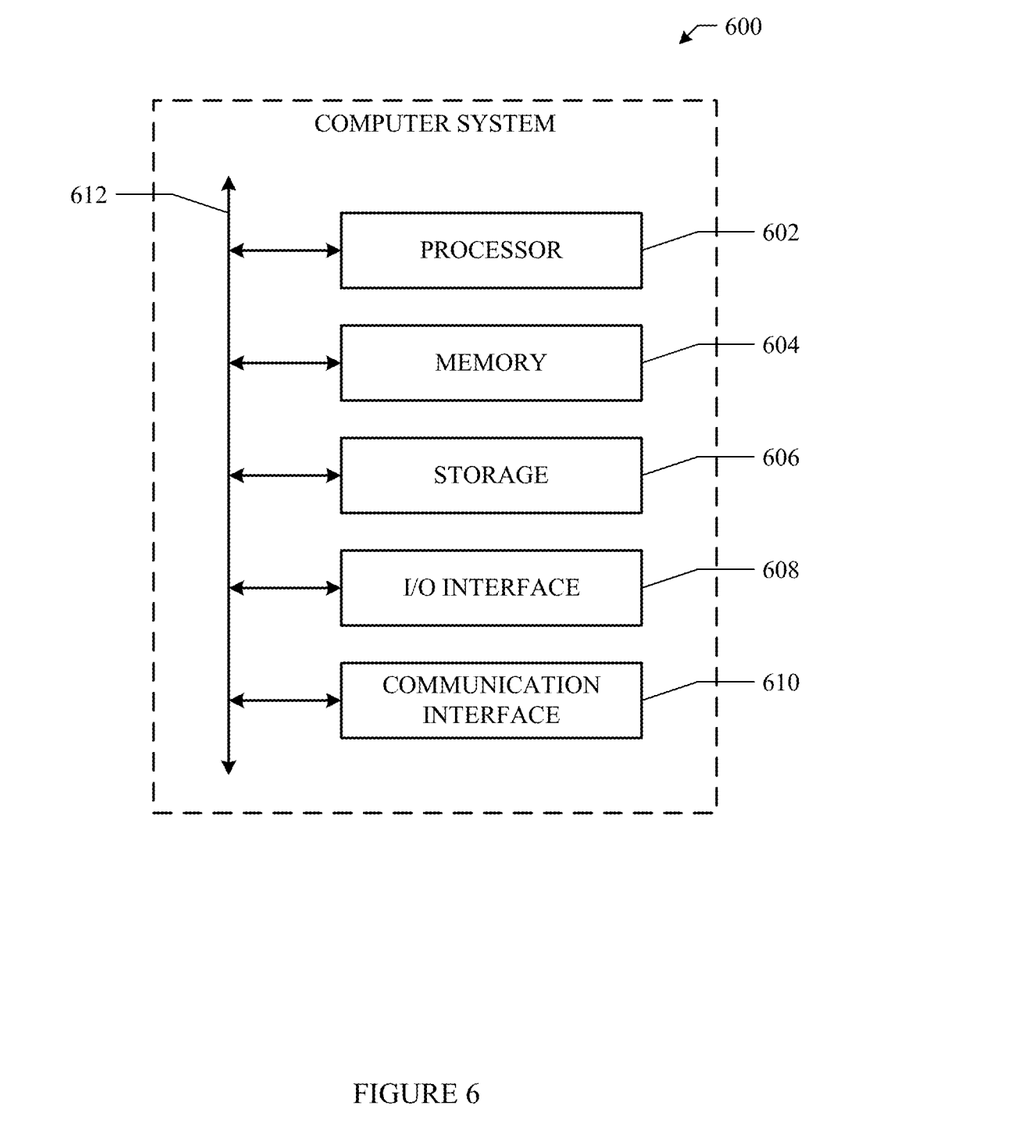
FIG. 6 illustrates an example computer system for performing particular embodiments.

FIG. 6 illustrates an example network device 600. Particular embodiments may be implemented on one or more network devices. In particular embodiments, one or more devices 600 perform one or more steps of one or more methods described or illustrated herein. In particular embodiments, one or more devices 600 provide functionality described or illustrated herein. In particular embodiments, software running on one or more devices 600 performs one or more steps of one or more methods described or illustrated herein or provides functionality described or illustrated herein. Particular embodiments include one or more portions of one or more devices 600.

This disclosure contemplates any suitable number of devices 600. This disclosure contemplates device 600 taking any suitable physical form. As example and not by way of limitation, device 600 may be an embedded device, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, device 600 may include one or more devices 600; be unitary or distributed; span multiple locations; span multiple machines; or reside in a cloud, which may include one or more cloud components in one or more networks. Where appropriate, one or more devices 600 may perform without substantial spatial or temporal limitation one or more steps of one or more methods described or illustrated herein. As an example and not by way of limitation, one or more devices 600 may perform in real time or in batch mode one or more steps of one or more methods described or illustrated herein. One or more devices 600 may perform at different times or at different locations one or more steps of one or more methods described or illustrated herein, where appropriate.

In particular embodiments, network device 600 includes a processor 602, memory 604, storage 606, an input/output (I/O) interface 608, a communication interface 610, and a bus 612. Although this disclosure describes and illustrates a particular device having a particular number of particular components in a particular arrangement, this disclosure contemplates any suitable device having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, device 600 may load instructions from storage 606 or another source (such as, for example, another device 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to device 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between device 600 and one or more I/O devices. Device 600 may include one or more of these I/O devices, where appropriate. One or more of these I/O devices may enable communication between a person and device 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between device 600 and one or more other devices 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, device 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, device 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Device 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of device 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a server computing system:
   sending instructions to a personal computing device associated with a first user of an online social network hosted by a social networking system to display one or more notifications on a display screen of the personal computing device while the personal computing device is in a locked state, wherein the one or more notifications are associated with one or more operations of a second user of the online social network, and wherein the one or more operations are associated with one or more interactions of the second user with one or more previously published contents of the online social network associated with the first user;
   receiving sensor data from the personal computing device to estimate a current user intention of the first user with respect to the personal computing device;
   in response to estimating the current user intention, sending instructions to the personal computing device to present one or more selectable user publication responses for the first user to select adjacent to the one or more notifications while the personal computing device is in the locked state, each selectable user response being associated with at least one interaction to the one or more operations of the second user on the previously published content of the online social network;
   receiving, from the personal computing device, user input comprising a selection of one or more of the selectable user publication responses on the personal computing device while the personal computing device is in the locked state;
   receiving, from the personal computing device, an indication that the first user has performed an authorization event associated with the personal computing device; and
   in response to the authorization event, retrieving the user input from the personal computing device for publication on the social-networking system in response to the selection of one or more of the selectable user publication responses adjacent to the one or more notifications while the personal computing device is in the locked state.

2. The method of claim 1, further comprising publishing one or more user responses corresponding to the user input.

3. The method of claim 1, wherein the instructions to display the one or more notifications on the display screen further comprise instructions to play a sound representing the one or more notifications using an audio output of the personal computing device, illuminate an indicator of the personal computing device, or cause the personal computing device to provide haptic output representing the one or more notifications.

4. The method of claim 1, wherein the selectable user publication responses adjacent to the one or more notifications while the personal computing device is in the locked state comprise one or more options for the user to generate or perform a comment, a like indication, a dislike indication, a delete action, a hide action, a categorization action, a moderation action, a rating, a flag, a characterization, an invitation acceptance action, an invitation decline action, or any combination thereof.

5. The method of claim 1, wherein the authorization event comprises an affirmative user action, the user action comprising entry of a valid password, a swipe gesture, a button click, activation of a touch sensor of the personal computing device, activation of a gyroscope of the personal computing device, activation of an accelerometer of the personal computing device, or any combination thereof.

6. The method of claim 1, wherein the authorization event comprises passive detection, the passive detection comprising detecting that a screen of the personal computing device is hidden, detecting that the personal computing device is connected for recharging, detecting that the personal computing device is located within a receptacle, or any combination thereof.

7. The method of claim 6, wherein the passive detection further comprises one or more of determining a location of the personal computing device, detecting that headphones are connected to the personal computing device, detecting that the personal computing device is being held by its owner, detecting that the personal computing device is connection to a designated communications network; and
   wherein the determining a location of the personal computing device is based on GPS information, triangulation information, proximity to one or more other designated safe devices, calendar information, or any combination thereof.

8. The method of claim 1, further comprising:
   accessing one or more publishing rules for publishing one or more user responses corresponding to the user input for interacting with the one or more notifications when the personal computing device is in the locked state;
   in response to a determination that the one or more publishing rules are enabled for the one or more user responses corresponding to the user input for interacting with the one or more notifications, presenting the one or more user responses on the personal computing device for confirmation;
   receiving user confirmation of at least one of the one or more user responses; and
   publishing each of the one or more user responses for which the user confirmation was received.

9. The method of claim 1, further comprising:
   accessing one or more publishing rules for publishing one or more user responses corresponding to the user input for interacting with the one or more notifications when the personal computing device is in the locked state;
   in response to a determination that the one or more publishing rules are disabled for the one or more user responses corresponding to the user input for interacting with the one or more notifications, publishing the one or more user responses corresponding to the user input directly without requesting user confirmation.

10. The method of claim 1, further comprising:
in response to a determination that the authorization event is a passive authorization event, partially unlocking the personal computing device; and
publishing one or more user responses corresponding to the user input while the personal computing device is partially unlocked.

11. The method of claim 9, further comprising:
in response to a determination that the authorization event is an affirmative authorization even, fully unlocking the personal computing device; and
publishing one or more user responses corresponding to the user input while the personal computing device is full unlocked.

12. The method of claim 1, wherein estimating the current user intention comprises determining, based on the sensor data, that the first user has picked up the personal computing device from a resting position and bring the personal computing device in front of the first user's face.

13. The method of claim 1, wherein the one or more notifications are displayed in a time order from an oldest notification to a newest notification.

14. A server computing system comprising: one or more processors; and one or more computer-readable non-transitory storage media coupled to one or more of the processors and comprising instructions operable when executed by one or more of the processors to cause the server computing system to:
send instructions to a personal computing device associated with a first user of an online social network hosted by a social networking system to display one or more notifications on a display screen of the personal computing device while the personal computing device is in a locked state, wherein the one or more notifications are associated with one or more operations of a second user of the online social network, and wherein the one or more operations are associated with one or more interactions of the second user with one or more previously published contents of the online social network associated with the first user;
receive sensor data from the personal computing device to estimate a current user intention of the first user with respect to the personal computing device;
in response to estimating the current user intention, send instructions to the personal computing device to present one or more selectable user publication responses for the first user to select adjacent to the one or more notifications, each selectable user response being associated with at least one interaction to the one or more operations of the second user on the previously published content of the online social network;
receive, from the personal computing device, user input comprising a selection of one or more of the selectable user publication responses on the personal computing device while the personal computing device is in the locked state;
receive, from the personal computing device, an indication that the first user has performed an authorization event associated with the personal computing device; and
in response to the authorization event, retrieve the user input from the personal computing device for publication on the social-networking system in response to the selection of one or more of the selectable user publication responses adjacent to the one or more notifications while the personal computing device is in the locked state.

15. The system of claim 14, wherein the one or more processors are further operable to execute the instructions to publish one or more user responses corresponding to the user input.

16. The system of claim 14, wherein the one or more processors operable to execute the instructions are further operable to:
play a sound representing the one or more notifications using an audio output of the personal computing device, illuminate an indicator of the personal computing device, or cause the personal computing device to provide haptic output representing the one or more notifications.

17. The system of claim 14, wherein the selectable user publication responses adjacent to the one or more notifications while the personal computing device is in the locked state comprise one or more options for the user to generate or perform a comment, a like indication, a dislike indication, a delete action, a hide action, a categorization action, a moderation action, a rating, a flag, a characterization, an invitation acceptance action, an invitation decline action, or any combination thereof.

18. The system of claim 14, wherein the authorization event comprises an affirmative user action, the affirmative user action comprising entry of a valid password, a swipe gesture, a button click, activation of a touch sensor of the personal computing device, activation of a gyroscope of the personal computing device, activation of an accelerometer of the personal computing device, or any combination thereof.

19. The system of claim 14, wherein the authorization event comprises a passive action, the passive action comprising detection that the screen of the personal computing device is hidden detection that the personal computing device is connected for recharging, detection that the personal computing device is located within a receptacle, or any combination thereof.

20. The system of claim 19, wherein the passive action further comprises one or more of determination of a location of the personal computing device, detection that headphones are connected to the personal computing device, detection that the personal computing device is being held by its owner, detection that the personal computing device is connected to a designated communications network; and
wherein the determination of a location of the personal computing device is based on GPS information, triangulation information, proximity to one or more other designated safe devices, calendar information, or any combination thereof.

21. One or more computer-readable non-transitory storage media embodying software operable when executed by a server computing system to:
send instructions to a personal computing device associated with a first user of an online social network hosted by a social networking system to display one or more notifications on a display screen of the personal computing device while the personal computing device is in a locked state, wherein the one or more notifications are associated with one or more operations of a second user of the online social network, and wherein the one or more operations are associated with one or more interactions of the second user with one or more previously published contents of the online social network associated with the first user;
receive sensor data from the personal computing device to estimate a current user intention of the first user with respect to the personal computing device;

in response to estimating the current user intention, send instructions to the personal computing device to present one or more selectable user publication responses for the first user to select adjacent to the one or more notifications, each selectable user response being associated with at least one interaction to the one or more operations of the second user on the previously published content of the online social network;

receive, from the personal computing device, user input comprising a selection of one or more of the selectable user publication responses on the personal computing device while the personal computing device is in the locked state;

receive, from the personal computing device, an indication that the first user has performed an authorization event associated with the personal computing device; and in response to the authorization event, retrieve the user input from the personal computing device for publication on the social-networking system in response to the selection of one or more of the selectable user publication responses adjacent to the one or more notifications while the personal computing device is in the locked state.

22. The media of claim 21, embodying software further operable when executed by the server computing system to publish one or more user responses corresponding to the user input.

23. The media of claim 21, wherein the instructions to display the one or more notifications on the display screen of the personal computing device further comprise instructions to play a sound representing the one or more notifications using an audio output of the personal computing device, illuminate an indicator of the personal computing device, or cause the personal computing device to provide haptic output representing the one or more notifications.

24. The media of claim 21, wherein the selectable user publication responses adjacent to the one or more notifications while the personal computing device is in the locked state comprise one or more options for the user to generate or perform a comment, a like indication, a dislike indication, a delete action, a hide action, a categorization action, a moderation action, a rating, a flag, a characterization, an invitation acceptance action, an invitation decline action, or any combination thereof.

25. The media of claim 21, wherein the authorization event comprises an affirmative user action, the user action comprising entry of a valid password, a swipe gesture, a button click, activation of a touch sensor of the personal computing device, activation of a gyroscope of the personal computing device, activation of an accelerometer of the personal computing device, or any combination thereof.

26. The media of claim 21, wherein the authorization event comprises a passive action, the passive action comprising detection that the screen of the personal computing device is hidden, detection that the personal computing device is connected for recharging, detection that the personal computing device is located within a receptacle, or any combination thereof.

\* \* \* \* \*